Feb. 17, 1959
F. B. OTTO
2,874,331
TRANSISTORIZED CURRENT TRANSFER APPARATUS
Filed April 14, 1958
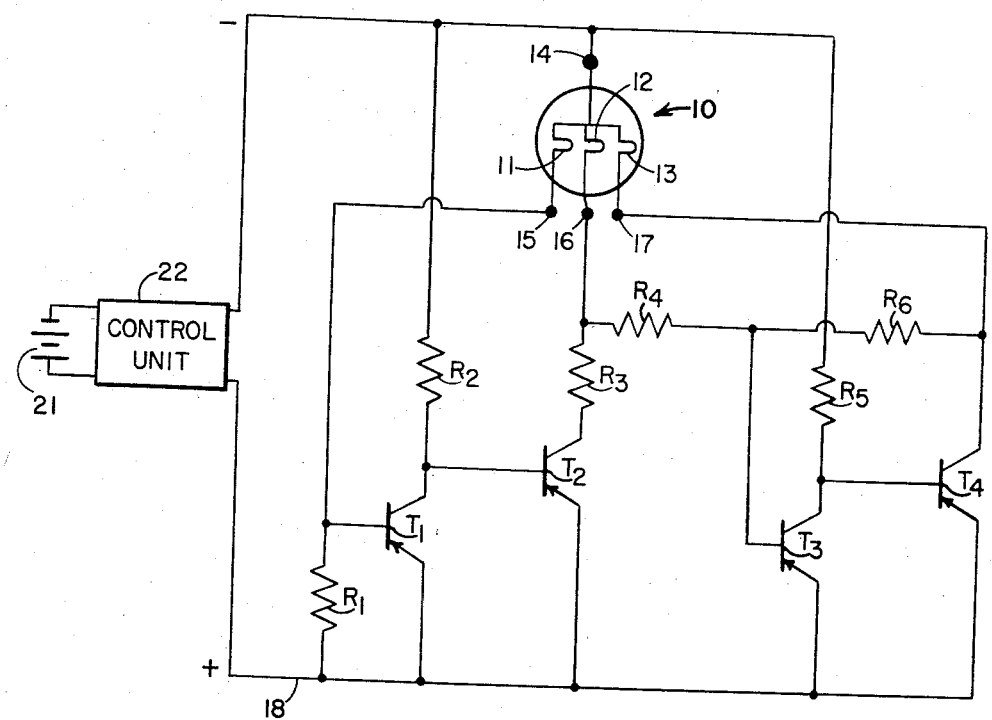
INVENTOR.
FRED B. OTTO
BY
ATTORNEY.

United States Patent Office 2,874,331
Patented Feb. 17, 1959

2,874,331

TRANSISTORIZED CURRENT TRANSFER APPARATUS

Fred B. Otto, Winchester, Mass., assignor to Sylvania Electric Products Inc., a corporation of Massachusetts Application April 14, 1958, Serial No. 728,444

8 Claims. (Cl. 315—93)

The present invention relates to apparatus for providing electrical current flow successively through each of a series of similar elements, one element at a time; current flow through any one element ceasing and current flow through the next element of the series taking place upon failure of the one element. The invention is particularly applicable to lighted devices of the warning or indicating types which require a high degree of dependability with a minimum of maintenance. Lighted aids to navigation are representative of devices of this nature, and will be referred to throughout this application to indicate the utility of the invention in a specific embodiment.

In the past, untended lighted aids to marine navigation typically have utilized various combustible gases or liquids such as, for example, compressed acetylene gas for fuel. The fuel was burned to produce a small intense flame. Usually such devices included a lens structure for focusing the resulting light in an effective manner.

Recently some of these lights have been modified to employ electrical incandescent lamps. When the lamps are placed in association with appropriate lenses very satisfactory light sources are obtained. The advantages of using electrically operated lamps include elimination of fuel storage within the aid and piping from the storage tank to the lantern. In addition a simple, sealed electrical device can be substituted for the gas pressure operated valve mechanism and pilot light arrangement usually employed to produce flashing light characteristics.

Untended electrically lighted aids are usually located at readily accessible points so that a reliable supply of electric power can be provided and frequent changes of the lamps can be made. However, the advantages of employing incandescent lamps in untended aids placed at remote locations have not been realized because of the problem of providing a suitable supply of electric power and because of the limited operating life of available incandescent lamps. In the past, limitations in life have precluded the economic use of storage batteries as the source of electrical power. However, recent advances in the art have resulted in the availability of storage batteries of reasonable size having greatly extended life capabilities. For the future, solar batteries hold forth possibilities for making limited amounts of electrical power available over exceptionally long periods of time.

The operating life of incandescent lamps capable of producing the intensity of light required for a navigational aid appears to have practical limitations at the present state of the art. This problem of limited lamp life can be alleviated by the use of multi-filament incandescent lamps. Multi-filament lamps operated from available types of storage batteries appear to be a very economical and practical means for lighting certain untended aids to navigation.

Therefore it is an object of my invention to provide an improved electrically lighted device which is dependable in operation and requires a minimum of maintenance.

It is a more specific object of my invention to provide apparatus incorporating a circuit arrangement for lighting only one filament of a multi-filament light source at a time, and upon failure of a lighted filament lighting a next filament in turn.

In achieving the objects of my invention a novel circuit utilizing transistors is employed wherein a substantial electrical current is caused to flow through one of a plurality of elements arranged in electrically parallel relationship. The particular path of current flow is determined by the conduction state of the transistors, which states in turn depend on the impedance conditions (i. e., the existence of closed or open circuits) in the various elements. More specifically, in relating the invention to its use with a plurality of electrical incandescent lamp filaments, each lamp filament with the exception of the first filament to be lighted is connected in series with a main or primary transistor. Each main transistor is biased in the off or low conduction condition as long as current flows through the output circuit of a respective auxiliary or secondary transistor. Each auxiliary transistor is biased in the on or high conduction condition only while there is a low impedance or closed circuit in the filament to be lighted immediately preceding the filament in series with the main transistor associated with the auxiliary transistor.

Details of the circuit of my invention and its mode of operation together with further objects, features, and advantages of the invention will be apparent from the following discussion of the single figure in the accompanying drawing. The drawing is a circuit diagram of a lighted navigational aid in accordance with my invention.

In the drawing there is shown a schematic representation of an electric incandescent lamp 10. The envelope of the lamp has within it three filaments 11, 12, and 13. The filaments are shown as having one common internal connection which is brought out to a common terminal 14 of the circuit. The other ends of the three filaments are led externally of the lamp and connected to first, second, and third circuit terminals 15, 16, and 17.

In the circuit a resistor $R_1$ is connected between the first terminal 15 and a common lead 18. A second resistor $R_2$ and a first transistor $T_1$ are connected in series between the common terminal 14 and the common lead 18. The emitter of the transistor is connected to the common lead and the collector to the resistor $R_2$. The base of the transistor is connected directly to the first terminal 15. A second transistor $T_2$ has its emitter connected to the common lead 18 and its collector connected to the second terminal 16 through a resistor $R_3$. The base of the second transistor is connected to the collector of the first transistor $T_1$.

A third transistor $T_3$ is in series with a resistor $R_5$ which is connected between the common terminal 14 and the collector of the transistor. The base of the third transistor $T_3$ is connected to the second terminal 16 through a resistor $R_4$, and its emitter is connected to the common lead 18. The collector of a fourth transistor $T_4$ is directly connected to the third terminal 17, and the emitter is directly connected to the common lead 18. The base of the fourth transistor $T_4$ is directly connected to the collector of the third transistor $T_3$. A resistor $R_6$ is connected between the base of the third transistor $T_3$ and the collector of the fourth transistor $T_4$. As will be apparent from the description below, of the operation of the circuit arrangement described above, transistors $T_2$ and $T_4$ are "main" transistors and transistors $T_1$ and $T_3$ are their respective "auxiliary" transistors as referred to in the general description of the invention set forth previously in the specification.

A D. C. supply in the form of a storage battery 21 is connected to the circuit through a control unit 22. The control unit, shown in the drawing in block diagram form, typically may by a simple automatic on-off switch responsive to ambient light conditions or may be a timing circuit for regulating the characteristic of the light signal. The control unit may also include an array of solar batteries and associated apparatus for maintaining the battery in charged condition. When utilizing PNP transistors as shown in the drawing, the negative terminal of the battery is connected to the common terminal 14 of the lamp 10 and the positive terminal of the battery is connected to the common lead 18.

With the power applied and a suitable three filament lamp properly connected across the terminals, the circuit operates in the following manner. Current flows between the common lead 18 and the common terminal 14 via the impedance consisting of the first filament 11 and the first resistor $R_1$ thus lighting the first filament. The voltage drop across the resistor $R_1$ biases the base of the transistor $T_1$ negatively with respect to its emitter. Since the collector of transistor $T_1$ is connected to a suitable negative potential source the transistor is turned on or placed in the high conduction condition or state. Nearly all of the voltage drop in the transistor output circuit takes place across the load resistor $R_2$ and the potential on the collector of the transistor $T_1$ approaches that of the common lead 18. Therefore, there is no significant potential difference between the emitter and base of transistor $T_2$ and this transistor is biased in the off condition or condition of low conduction. With no appreciable current flow through transistor $T_2$, the series connected second filament 12 does not light.

The base of the third transistor $T_3$ is connected to the second filament at the second terminal 16 making it negative with respect to the emitter. The transistor is thus biased in the on or high conduction condition. There is some base current flow through transistor $T_3$ which is limited by the base resistor $R_4$. The sum of the base current through $R_4$ and the low conduction current in the collector circuit of transistor $T_2$ flows through the second filament 12. However, this current is insufficient to light the filament or to cause any significant loss of power. Since transistor $T_3$ is biased in the on or high conduction condition, substantial current flows through its load resistor $R_5$. Nearly all of the potential drop in the output circuit of transistor $T_3$ occurs across the resistor $R_5$, and thus the potential on the collector of transistor $T_3$ approaches that of the common lead 18. This potential is applied to the base of the fourth transistor $T_4$ biasing that transistor in the off or low conduction and preventing the third filament 13 from being lighted. Thus, with the first filament lighted, auxiliary transistors $T_1$ and $T_3$ are on and they in turn cause main transistors $T_2$ and $T_4$ to be biased off thereby preventing substantial current flow through the second and third filaments.

When the first filament 11 burns out creating a high impedance or open circuit between terminals 14 and 15, the base of transistor $T_1$ assumes the same potential as the emitter thus biasing transistor $T_1$ in the off or low conduction condition. With auxiliary transistor $T_1$ turned off substantially no current flows through the load resistor $R_2$ and the base of the main transistor $T_2$ becomes more negative with respect to its emitter. Transistor $T_2$ is thus turned on and substantial current flows through its load circuit which includes the second filament 12. Thus, the second filament is lighted.

Current flow through the second transistor $T_2$ and resistor $R_3$ produces sufficient voltage drop to hold auxiliary transistor $T_3$ biased on. Feedback resistor $R_6$ is provided to assist in assuring that the base potential of transistor $T_3$ remains sufficiently negative to hold that transistor on. The feedback resistor $R_6$ is not essential to maintain the transistor $T_3$ turned on, but its use does permit a suitable selection of component values resulting in greater overall circuit efficiency. While auxiliary transistor $T_3$ remains on, main transistor $T_4$ remains biased in the off or low conduction condition. Thus, with the first filament 11 burned out, the second filament 12 becomes lighted, with auxiliary transistor $T_1$ turned off and main transistor $T_2$ turned on. Auxiliary transistor $T_3$ remains on and causes main transistor $T_4$ to be biased off thus preventing substantial current flow through the third filament 13.

When the second filament 12 burns out, creating an open circuit between terminals 14 and 16, the current flow through transistor $T_2$ is interrupted and the potential at terminal 16 becomes more positive. The biasing potential at the base of transistor $T_3$ thus is increased to near that of its emitter and the transistor is turned off. Substantial current no longer flows through the load resistor $R_5$ and the potential at the collector of auxiliary transistor $T_3$ becomes more negative thus biasing main transistor $T_4$ on. Substantial current then flows through the transistor load impedance which is the third filament 13. Thus, with the first and second filaments burned out, the third filament is lighted. Auxiliary transistor $T_1$ is turned off, no substantial current flows through main transistor $T_2$, and auxiliary transistor $T_3$ is biased off, thereby permitting main transistor $T_4$ to conduct the current required to light the third filament 13.

As an illustration of a specific embodiment of my invention a Sylvania three filament navigational beacon lamp may be operated very satisfactorily in conjunction with the disclosed circuit. Each of the three filaments of the lamp is rated at 0.46 ampere at 6.2 volts. The lamp is connected in the circuit as shown in the drawing and 6 volts is applied between the common terminal 14 and the common lead 18 with the terminal being negative. The following are the types and values of circuit components used:

| | |
|---|---|
| $R_1$ | 1 ohm. |
| $R_2$ | 330 ohms. |
| $R_3$ | .25 ohm. |
| $R_4$ | 270 ohms. |
| $R_5$ | 330 ohms. |
| $R_6$ | 3300 ohms. |
| $T_1$ | Sylvania type 2N34. |
| $T_2$ | Sylvania type 2N242. |
| $T_3$ | Sylvania type 2N34. |
| $T_4$ | Sylvania type 2N242. |

Efficiencies of between 80% and 90% have been obtained using components having the foregoing values. The efficiency varies depending on whether the first, second, or third filament is the lighted one. The measure of efficiency is the power consumed in the lighted filament in proportion to the power applied between the common terminal and the common lead. Losses are attributable to both low current and high current conduction in the transistor and resistors, and to low current conduction in the unlighted filaments.

Various modifications of the disclosed circuit are obviously possible without departing from the teaching of my invention. For example, NPN transistors may be substituted for PNP transistors with appropriate changes in applied polarity. Although my invention is described as being primarily concerned with aids to navigation, it is also applicable in obstacle, exit, and other warning or indicating lights where reliability is an important consideration for safety. The utility of the invention in the operation of a series of single filament lamps in lieu of a single multi-filament lamp will be apparent.

The circuit described may also be adapted to service any number of filaments by cascading transistor pairs so that a main transistor in series with each filament is biased off by the on condition of an auxiliary transistor which, in turn, is held on by a closed circuit or low impedance condition existing in the preceding filament. Furthermore, other elements or components may be substituted for lamp filaments.

I claim:

1. Apparatus for providing for electric current flow through each of a series of elements in succession including, in combination, first terminal means for connection to a first element, second terminal means for connection to a second element, a main transistor connected in series with said second terminal means, an auxiliary transistor connected to said main transistor, first biasing means for biasing said main transistor in the low conduction condition only while said auxiliary transistor is in the high conduction condition, and second biasing means for biasing said auxiliary transistor in the high conduction condition only while a closed circuit exists across said first terminal means.

2. Apparatus for providing for electric current flow through each of a series of elements in succession including, in combination, a first terminal means for connection to a first element, second terminal means for connection to a second element, a main transistor connected in series with said second terminal means, an auxiliary transistor connected to said main transistor, first biasing means associated with said auxiliary transistor for biasing said main transistor in the low conduction condition only while said auxiliary transistor is in the high conduction condition, and second biasing means associated with said first terminal means for biasing said auxiliary transistor in the high conduction condition only while a closed circuit exists across said first terminal means.

3. Apparatus for providing for electric current flow through each of a series of elements in succession including, in combination, first terminal means for connection to a first element, a first transistor, first biasing means for biasing said first transistor in the high conduction condition only while current flows through said first terminal means, second terminal means for connection to a second element, a second transistor connected in series with said second terminal means, second biasing means for biasing said second transistor in the low conduction condition only while said first transistor is in the high conduction condition, a third transistor, third biasing means for biasing said third transistor in the high conduction condition only while a closed circuit exists across said second terminal means, a third terminal means for connection to a third element, a fourth transistor connected in series with said third terminal means, fourth biasing means for biasing said fourth transistor in the low conduction condition only while said third transistor is in the high conduction condition.

4. Apparatus for providing for electric current flow through each of a series of elements in succession including, in combination, first terminal means for connection to a first element, a first transistor, first biasing means associated with said first terminal means for biasing said first transistor in the high conduction condition only while current flows through said first terminal means, second terminal means for connection to a second element, a second transistor connected in series with said second terminal means, second biasing means associated with said first transistor for biasing said second transistor in the low conduction condition only while said first transistor is in the high conduction condition, a third transistor, third biasing means associated with said second terminal means for biasing said third transistor in the high conduction condition only while a closed circuit exists across said second terminal means, a third terminal means for connection to a third element, a fourth transistor connected in series with said third terminal means, fourth biasing means associated with said third transistor for biasing said fourth transistor in the low conduction condition only while said third transistor is in the high conduction condition.

5. Apparatus for use in a lighted device including a circuit for providing for electric current flow through each of a series of incandescent lamp filaments in succession, said apparatus including, in combination, a first set of terminals for connection to a first filament, a second set of terminals for connection to a second filament, a main transistor connected in series with said second set of terminals, an auxiliary transistor directly connected to said main transistor, a resistance in the output circuit of said auxiliary transistor for biasing said main transistor in the low conduction condition only while said auxiliary transistor is in the high conduction condition, and resistance means connected to one of the terminals of said first set of terminals for biasing said auxiliary transistor in the high conduction condition only while a closed circuit exists across said first set of terminals.

6. A multi-filament electric incandescent lighted device having a circuit for lighting each filament in succession one at a time as previously lighted filaments burn out including, in combination, a first lamp filament, a first transistor, a first resistor associated with said first filament for biasing said first transistor in the high conduction condition only while current flows through said first filament, a second filament, a second transistor connected in series with said second filament, a second resistor in the output circuit of said first transistor for biasing said second transistor in the low conduction condition only while said first transistor is in the high conduction condition, said second filament being lighted only while said second transistor is in the high conduction condition, a third transistor, resistance biasing means including said second filament for biasing said third transistor in the high conduction condition only while said second filament is not open-circuited, a third filament, a fourth transistor connected in series with said third filament, a third resistor in the output circuit of said third transistor for biasing said fourth transistor in the low conduction condition only while said third transistor is in the high conduction condition, said third filament being lighted only while said fourth transistor is in the high conduction condition.

7. A lighted aid to navigation having a three-filament electrical incandescent lamp and a circuit for lighting each filament one at a time in succession as previously lighted filaments burn out including, in combination; first and second terminals for connection to a source of D. C. potential; a first resistor and a first lamp filament connected in series between said terminals with said first resistor connected directly to the first terminal, a first transistor and a second resistor also connected in series between said terminals, the emitter of said first transistor being connected to said first terminal, the collector being connected through said second resistor to the second terminal and the base being connected to the junction between the first resistor and the first filament so that the voltage across the first resistor biases the first transistor in the high conduction condition when said first filament is conductive; a second transistor, a third resistor and a second filament connected in series between said terminals, the emitter of said second transistor being directly connected to the first terminal, the collector being connected to the second terminal through the third resistor and the second filament, said third resistor being connected intermediate the filament and the collector, and the base being connected to the collector of the first transistor so that the second transistor is biased in the low conduction condition as long as the first transistor is in the high conduction condition; a third transistor and a fourth resistor connected in series between said terminals, the emitter of said third transistor being connected to said first terminal, the collector being connected through said fourth resistor to the second terminal, and the base being connected through a fifth resistor to the junction between the third resistor and the second filament so that the third transistor is biased in the high conduction condition as long as the second filament remains conductive; and a fourth transistor and a third filament connected in series across said terminals, the emitter of said fourth transistor being connected to said first terminal, the collector being connected to said third filament, and the base being connected to the collector of said third transistor so that the fourth transistor is biased in the low conduction condition as long as the third transistor is in the high conduction condition.

8. Apparatus for providing for electric current flow through each of a series of elements in predetermined sequence including, in combination, a series of terminal means each adapted for connection to an element, circuit means associated with each of said terminal means except the last of said series for permitting current to flow through one of said series of terminal means upon the interruption of current flow through the terminal means in said series immediately preceding said one terminal means each of said circuit means comprising a first transistor in series with one of said series of terminal means, a second transistor connected to said first transistor, first biasing means for biasing said first transistor in the low conduction condition only while said second transistor is in the high conduction condition, and second biasing means for biasing said second transistor in the high conduction condition only while a closed circuit exists across the terminal means in said series immediately preceding said terminal means.

No references cited.